United States Patent [19]

Smith

[11] Patent Number: 5,166,972
[45] Date of Patent: Nov. 24, 1992

[54] GROUP EMERGENCY CALL SYSTEM

[75] Inventor: Dawn Smith, Carp, Canada

[73] Assignee: Mitel Corporation, Kanata, Canada

[21] Appl. No.: 426,418

[22] Filed: Oct. 26, 1989

[30] Foreign Application Priority Data

Nov. 15, 1988 [CA] Canada ............................ 583164

[51] Int. Cl.$^5$ ............................................. H04M 11/04
[52] U.S. Cl. .......................................... 379/49; 379/37; 379/45
[58] Field of Search ............... 379/49, 37, 202, 203, 379/204, 216, 39, 40, 41, 42, 43, 45, 46, 48

[56] References Cited

U.S. PATENT DOCUMENTS

| | | | |
|---|---|---|---|
| 3,865,985 | 2/1975 | Stankus | 379/49 |
| 4,259,549 | 3/1981 | Stehman | 379/204 |
| 4,466,095 | 8/1984 | Kawano et al. | 370/63 |
| 4,694,487 | 9/1987 | Chang et al. | 379/274 |
| 4,747,130 | 5/1988 | Ho | 379/269 |

*Primary Examiner*—James L. Dwyer
*Assistant Examiner*—Jason Chan
*Attorney, Agent, or Firm*—Antonelli, Terry, Stout & Kraus

[57] ABSTRACT

A group emergency call system for use in a central office exchange or other communication system for alerting a group of people in the event of an emergency. Data in the form of a hunt group assignment table is stored within the communication system, containing a predetermined pilot number for defining a particular emergency hunt group within the communication system, and a plurality of directory numbers corresponding to respective ones of the subscriber sets assigned to the emergency hunt group. Circuitry is provided for receiving dialed digit signals designating an incoming emergency call from a predetermined one of the subscriber sets and comparing the dialed digits with the pilot number, and in the event the dialed digit signals correspond to the predetermined pilot number generating a request device message signal. Circuitry is provided for receiving the request device message signal and in response retrieving the directory numbers from the emergency hunt group assignment table and generating a plurality of ringing signals for simultaneously ringing respective ones of the subscriber sets assigned to the emergency hunt group, such that members of the emergency hunt group are alerted to the incoming emergency call.

7 Claims, 3 Drawing Sheets

GROUP EMERGENCY CALL SYSTEM

BACKGROUND OF THE INVENTION

This invention relates in general to communication systems, and more particularly to a group emergency call system for alerting a group of people connected to a central office exchange in the event of an emergency.

Group emergency call systems are intended for use by volunteer fire personel, civil defence, or other groups requiring quick and simultaneous distribution of a message from a single individual to a number of other individuals. This service has historically been used in rural areas to provide one-way communication from a control position to a preselected group or groups of individuals. The traditional method of providing this service has been to instal an adjunct switching system in the central office exchange that is cross-connected to lines dedicated for emergency use by the group emergency call system. Examples of such prior art cross-connectedadjunct or add-on systems are the 291 Emergency Reporting System by Tellabs Inc., and the Emergency Out Dial System manufactured by Message Processing System, Inc.

Such prior art systems suffer from the disadvantages of being expensive and complex, and requiring external maintenance terminals and sophisticated electronic equipment. Furthermore, such add-on emergency group call systems are incapable of providing standard central office or PBX call functions such as automatic call forwarding from an emergency hunt group subscriber set to a further set in the exchange. For example, the afformentioned 291 Emergency Reporting System utilizes a siren for notifying subscribers whose sets have been placed in call forward or do-not-disturb modes.

SUMMARY OF THE INVENTION

According to the present invention, a group emergency call system is provided in which the emergency call functionality has been incorporated within a central office exchange.

The advantages of the present system are cost savings due to the fact that the system functionality is incorporated within the central office exchange without the requirement for add-on sophisticated electronic components. Also, there is provided the ability to utilize existing central office or PBX call functionality (e.g. call forwarding, etc.), and the ability to utilize existing maintenance terminals, etc.

In general, according to the present invention, there is provided a group emergency call system for use in a communication system having a plurality of subscriber sets connected thereto. The group emergency call system is comprised of circuitry for storing one or more emergency hunt group assignment data tables each containing a predetermined pilot number for defining a predetermined emergency hunt group within the communication system, and a plurality of directory numbers corresponding to respective ones of the subscriber sets assigned to the predetermined emergency hunt group. Circuitry is also provided for receiving dialed digit signals designating an incoming emergency call from a predetermined one of the subscriber sets and comparing the dialed digit signals with the pilot number, and in the event the dialed digit signals correspond to the predetermined pilot number generating a request device message signal. Circuitry is provided for receiving the request message signal and in response retrieving the directory numbers from a corresponding one of the emergency hunt group assignment tables and generating a plurality of ringing signals for simultaneously ringing the respective ones of the subscriber sets assigned to the emergency hunt group whereby members of the emergency hunt group are alerted to the incoming emergency call.

BRIEF DESCRIPTION OF THE DRAWINGS

A better understanding of the present invention will be obtained with reference to the detailed description below in conjunction with the following drawings in which.

DESCRIPTION OF THE PREFERRED EMBODIMENTS

Figure 1:
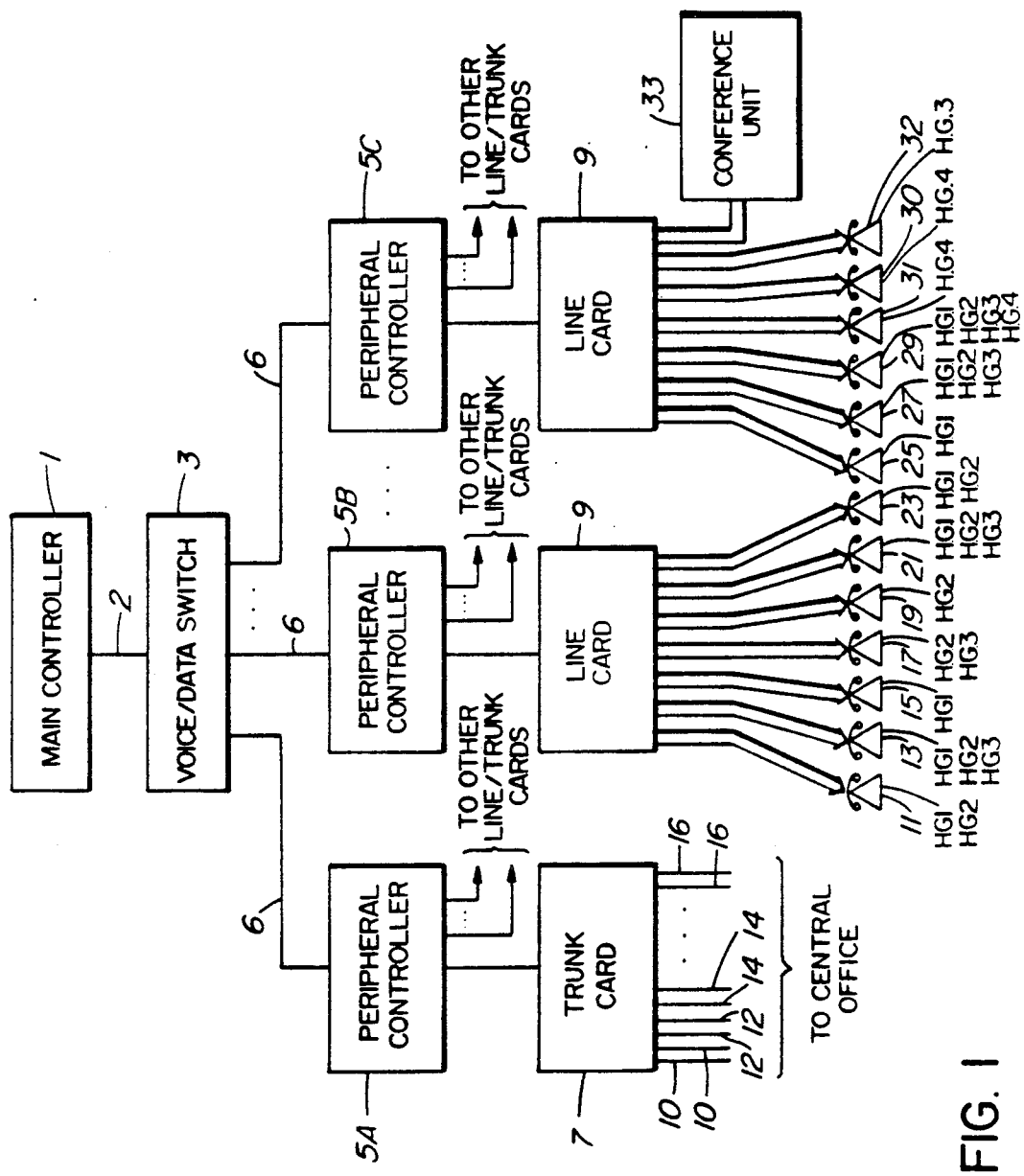
FIG. 1 is a block diagram of a communication system configured for effecting the group emergency call system of the present invention.

Turning to FIG. 1, a communication system such as a central office exchange or PABX, is shown connected to a plurality of trunk lines 10, 12, 14 ... 16 for receiving calls from a remote central office or PABX (not shown), and routing the calls to a plurality of call answering stations.

The basic system consists of a main controller 1, which controls the operation of the entire system, i.e. keeping track of established message paths, setting up new paths, and receiving and sending supervisory and control messages related to the progress of each requested and established call.

The main controller 1 is connected via one or more high speed 16 bit parallel data buses 2 to a voice and data switch network or controlled matrix 3.

The switch 3 is connected to one or a plurality of peripheral controllers 5A, 5B ... 5C via serial data lines or links 6. The peripheral controllers are connected to a plurality of peripheral interfaces such as trunk card 7 and line cards 9 to which peripheral units such as trunk lines 10, 12, 14 ... 16, and call answering stations 11, 13, 15 ... 32 are connected.

The links 6 between the peripheral controllers 5A, 5B ... 5C and switch 3 are preferably serial links, e.g. 32 channels, operating at 2.048 megahertz per second.

The call answering stations are arranged into a plurality of emergency hunt groups, such as H.G.1, H.G.2, H.G.3, and H.G.4. In other words, incoming calls assigned to a predetermined hunt group (e.g. H.G.1) will be routed for answering by the stations which have been assigned to that hunt group (i.e. stations 11, 13, 15, 21, 23, 25, 27 and 29).

The system operates as follows, taking as an example the initiation of an emergency call to the subscribers of hunt group H.G.1, by subscriber set 11.

The peripheral controllers 5A, 5B ... 5C continuously scan the line and trunk cards for service requirements (i.e. the presence of supervisory signals presented to the peripheral controllers by a subscriber set). In the case of a request for initiating an emergency call to the members of emergency hunt group H.G.1 from subscriber set 11, for example, the hunt group member at subscriber set 11 goes off-hook for initiating the call. Peripheral controller 5B detects the presence of an off-hook signal at subscriber set 11 via line card 9 and in response generates a supervisory request for service signal in a well known manner to the main controller 1, via link 6, switch 3, and bus 2. In response, the main controller 1 generates a message signal to the peripheral controller 5B for generating dial tone to the subscriber set 11.

Next, the hunt group member at subscriber set 11 dials a predetermined pilot number (i.e. 7 digit telephone number) designating the emergency hunt group H.G.1. The peripheral controller 5B detects the presence of the dialing digits and in response sends a further message signal via links 6, switch 3, and bus 2 to the main controller 1. The main controller retains a plurality of hunt group assignment tables in memory, for assigning each pilot number to a specific emergency hunt group, as well as assigning the directory numbers for predetermined member subscriber sets to the hunt group. Access to the emergency call hunt group is restricted by an assigned class of service. In other words, only predetermined ones of the subscriber sets identified by directory numbers are permitted by the system to initiate an emergency call.

In the event that the incoming emergency call is to be routed to H.G.1, the main controller 1 generates and transmits a message through voice and data switch 3 to the peripheral controllers 5B and 5C for simultaneously ringing the subscriber sets 11, 13, 15, 21, 23, 25, 27 and 29 with a distinctive ringing pattern (e.g. 3 short bursts of ringing signal in repetition), such that members may distinguish between normal calls to their homes and an emergency call.

Busy group member subscriber sets, and all parties to whom they are connected are given an emergency tone (e.g. ½ second audible ringing signal every 3 seconds) as notification that an emergency call is waiting. Once the busy group members hang up, the emergency call rings the respective member subscriber sets. If all group members are busy, the caller at subscriber set 11 hears audible ringing while the call waits to be answered by the designated members.

Group member subscriber sets that are in make busy or do not disturb mode do not ring. If all group members are in make busy mode, the caller at subscriber set 11 is given busy tone. If all group members are in do not disturb mode, the emergency call will override and ring all of the members. This feature is not possible with prior art add-on emergency call systems.

If a group member is locally call forwarded, the emergency call will follow the forwarding and ring the forward destination. If the forward destination is also locally call forwarded, the emergency call will follow the forwarding a second time. If that destination is also call forwarded, the emergency call will override the forwarding. If any of the destinations are forwarded outside of the central office exchange, the forwarding is overriden. This feature is also not provided by prior art add-on systems.

The caller at subscriber set 11 hears audible ringing until the first one of the group member subscriber sets 11, 13, 15, 21, 23, 25, 27 or 29 answers, at which time the caller is given silence.

The emergency call type may be defined within the hunt group assignment table as being one of either broadcast (i.e. a one-way broadcast connection from the caller to each of the members) or conference (i.e. establishment of a conference call between the caller and all members of the hunt group).

In the event that the emergency call type has been assigned within the hunt group assignment table to broadcast, a one-way broadcast connection is established through voice and data switch 3 to each of the hunt group member subscriber sets 13, 15, 21, 23, 25, 27 and 29 via the respective peripheral controllers 5B and 5C and line cards 9. As subsequent group members answer the emergency call, they are connected in sequence to the broadcast.

In the event that the emergency call type which is assigned to the hunt group is conference, the caller at subscriber set 11 hears audible ringing until the first group member answers, at which time a 2 way communication path is established via voice and data switch and the associated peripheral controllers 5B or 5C and line cards 9. As subsequent members answer, they are added to the conference. Once the conference becomes full (i.e. caller at set 11 plus 7 members), subsequent members to answer the call are connected in a broadcast fashion. As members leave the conference (i.e. go on-hook), the broadcast members are connected to the conference call.

Group members that do not answer the incoming emergency call will continue to ring, or the call will continue to wait for the member to become free until the caller at subscriber set 11 hangs up.

The hunt group assignment data table stored within main controller 1, discussed above, contains the information pertaining to the hunt group receiving an emergency call. Within the hunt group assignment data table, the pilot number is assigned to the group, the emergency call type and a maximum of 32 group members are also assigned, as shown in Table 1 below, with only three members programmed:

TABLE 1

| HUNT GROUP ASSIGNMENT | | |
| --- | --- | --- |
| Pilot Number: 5110000 | | Name: Volunteer Fire |
| Hunt Mode: Emergency | | Priority: 1 Ring Type El |
| (Emergency Application) Emergency call type: Conference | | |
| Member | Directory Number | Name |
| 1 | 5110101 | B. Owen |
| 2 | 5110305 | W. Quon |
| 3 | 5112360 | D. Murphy |

A class of service assignment data table is also stored within the main controller 1 for indicating which features may be accessed by a particular subscriber set. Thus, predetermined ones of the subscriber sets (which do not have to be an emergency group member) may be given access to initiating the emergency call function.

Figure 2:
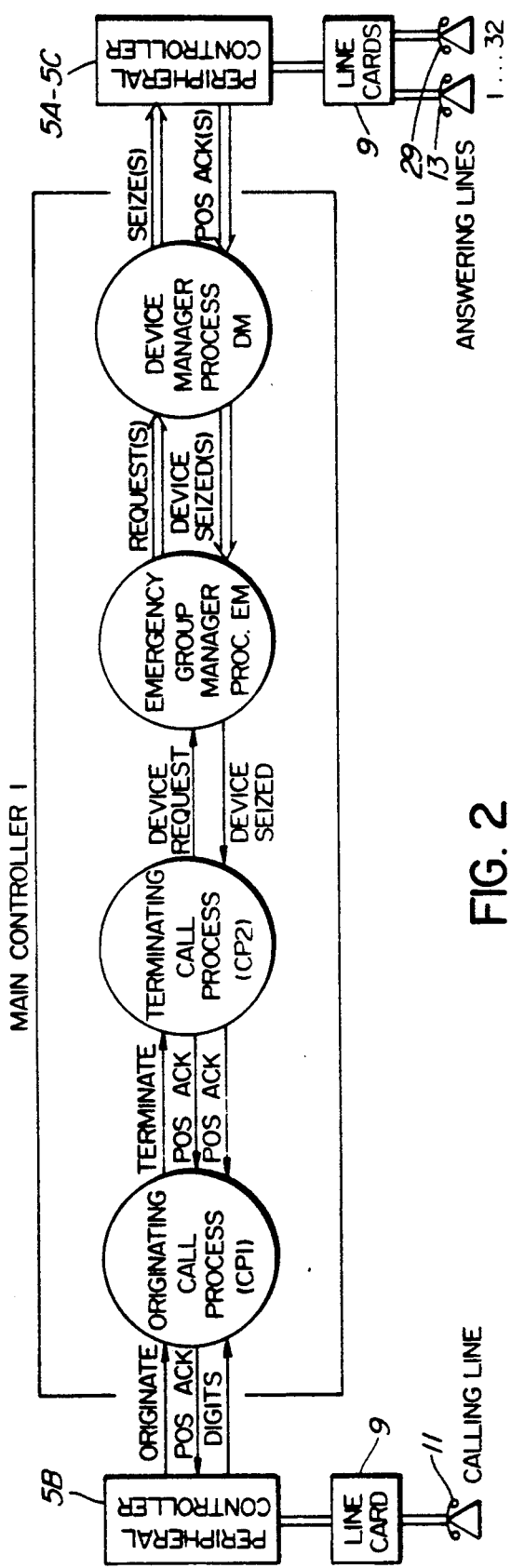
FIG. 2 is a schematic block diagram illustrating call processing features for activating an emergency call within the communication system of FIG. 1.
Figure 3:
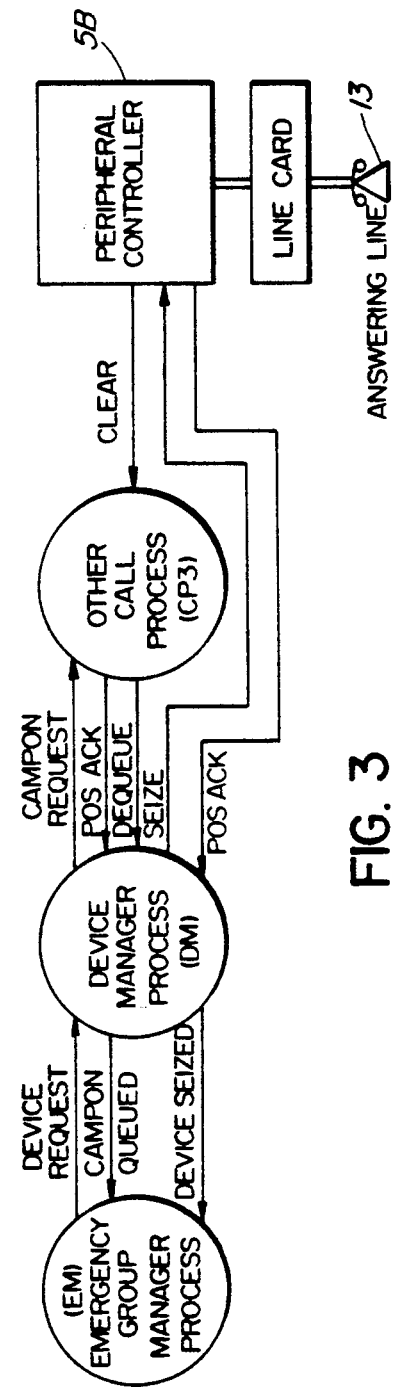
FIG. 3 is a schematic block diagram illustrating call processing features associated with seizing a predetermined subscriber set during activation of the emergency call.
Figure 4:
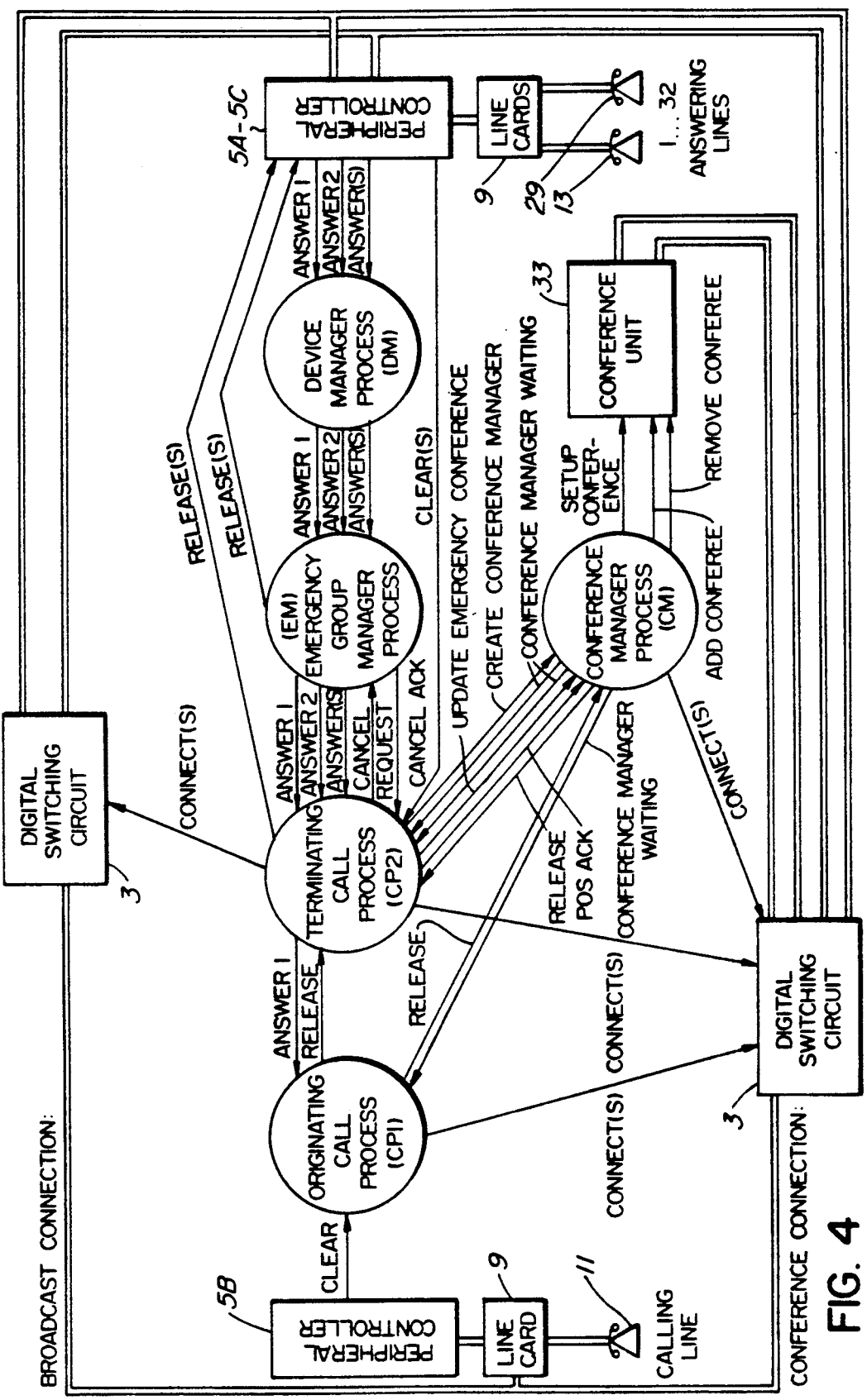
FIG. 4 is a schematic block diagram illustrating call processing features associated with predetermined subscriber sets answering the emergency call.

A more detailed description of the present invention will be obtained with reference to FIGS. 2-4 in conjunction with FIG. 1.

An incoming call or originating call from one of the subscriber sets (e.g. subscriber set 11) is carried by the associated line and is received by the associated line card 9. The line card 9 detects loop current and in response generates a supervisory signal for reception by the associated peripheral controller 5b. In response to receiving the loop current and indication signal, controller 5b generates an originate message signal for transmission to main controller 1 of the central office exchange. The originate signal is comprised of a plurality of bits designating the particular subscriber's line on which the incoming call is being received, the predetermined line card 9 within the system, etc., as shown in Appendix A.

The originate signal is generated by a main controller subroutine according to the template origination-tmpl, and is comprised of a 4 byte value sw-id which is a central office identifier for the originating device (i.e. ringing subscriber line from subscriber set 11).

The originate message signal is received by the main controller 1 which in response establishes a call process routine designated CP1 for encoding a pos-ack message signal which is transmitted from the main controller 1 to the peripheral controller 5B connected to line card 9, for acknowledging receipt of the originate message signal.

The format of the pos-ack signal is shown in Appendix A, and is generated according to the pos-ack-tmpl main controller template for acknowledging any one of the following main controller message signals: originate, terminate, seize, and update emergency conference, as discussed in greater detail below. The pos ack message for acknowledging the originate signal is comprised of an acknowledgment: byte and connect data consisting of chan 1 and chan 2 information each comprised of a 3 byte value csc-id for designating which channels of the voice/data switch 3 (FIG. 1) are to be used in routing the call to the appropriate hunt group (e.g. H.G.1).

The CP1 call process then determines which hunt group the incoming call should be routed to. This is done by detecting termination digits dialed by the subscriber set 11. The CP1 call process decodes the termination information from the originate signal and generates a terminate signal, conforming to the format shown in Appendix A.

In particular, the termination-seize-tmpl template defines a 2 byte portion of the message signal denoted cr-ptr; ptr-to-call-record designating the address of the call record used by the terminating call process, and a 4 byte portion denoted terminators-swid; sw-id for providing a software identifier for the termination (i.e. an identification of the programmed emergency call hunt group).

A further call process (CP2) receives and decodes the terminate message signal from the CP1 process and in response generates a further pos-ack message signal for acknowledging receipt of the terminate message signal. As discussed above, the pos-ack signal conforms to the format shown in Appendix A. In this case, the pos-ack message consists of a nil-function-code for ackhowledgement; byte.

The CP2 call process generates a request device message signal for ringing the designated members of the emergency call hunt group (e.g. hunt group H.G.1). The request device message signal conforms to the format shown in Appendix A.

The request device message signal is received via a further software process within the main controller designated as the emergency group manager process (EM), which in response searches the designated hunt group (e.g. H.G.1) for the member subscriber sets (e.g. subscriber sets 13, 15, 21, 23, 25, 27 and 29). The terminating call process (CP2) determines the ring type to apply to the designated hunt group and sends this information as part of the request device message signal.

Upon receipt of the request device message signal, the emergency group manager (EM) formulates and transmits individual request device message signals to the device manager process (DM) for each member assigned to the emergency hunt group that is in an idle, or busy state. The request message signal also specifies the ring type to apply and that camp-on queueing is required.

Upon receipt of the individual request device message signals, the device manager process (DM) allocates PCM channels and sends a seize message signal for reception by the peripheral processors 5A-5C for controlling the various line cards 9 connected to the assigned emergency hunt group member subscriber sets to which the call is being routed. The seize message signal conforms to the format shown in Appendix A.

In particular, the seize message signal is generated from a seize-connect-ring tmpl template and is comprised of a function-code byte followed by a succession of 6 bytes indicative of channel and link numbers for the received and transmit PCM channels carrying the incoming call to and from the subscriber set 11, and an end-of-message byte. The seize message signal also contains a designation of the required ring type.

The peripheral controllers 5A-5C generate respective signals to the associated line cards 9 for generating ringing signal on the lines connected to the assigned hunt group member subscriber sets, and return pos-ack message signals to the device manager process. The device manager process (DM) returns a device seized message signal containing the allocated channels to the emergency hunt group manager process (DM) upon receipt of each pos-ack message signal.

When the first device seized message is received by the emergency group manager process (DM), it is forwarded onto the terminating call process (CP2). When the terminating call process receives the device seized message signal, it then sends a pos-ack to the originating call process (CP1) to acknowledge that a device has been seized.

For each device seized message that is received by the emergency group manager process (EM), the channels that were assigned to the device are stored within the main controller 1.

The device seized message signal conforms to the format shown in Appendix A.

FIG. 3 illustrates the call processing entities which operates in the event that a member's subscriber set is busy. Once the device manager (DM)process receives the affformentioned request device message signal for the busy set from the emergency group manager (EM), it then send a camp-on request message signal to a call process (CP3) currently in control of the busy subscriber set (e.g. subscriber set 3). The call process CP3 responds by generating a pos-ack signal to the device manager process (DM).

Upon receipt of the pos-ack message signal, the device manager process (DM) sends a camp-on queued message signal to the emergency group manager process (EM). When the call process (CP3) clears, it sends a de-queue message signal to the device manager process (DM) which then seizes the line connected to the assigned group member subscriber set and sends a device seized message signal back to the emergency group manager process (EM). The camp-on request message, camp-on queued message and de-queue message signals conform to the format shown in Appendix A.

With reference to FIG. 4, two possible emergency call types are indicated; broadcast connection and conference connection.

When a member of the hunt group (e.g. subscriber set 13) answers the incoming emergency call, the line card 9 detects an off-hook condition of the subscriber set and generates an appropriate supervisory message to the peripheral controller (e.g. controller 5A). The peripheral controller then generates an answer message signal to the device manager process (DM) which then forwards the answer message signal to the emergency group manager process (EM). The emergency group manager process adds the allocated channels for carrying audio information to subscriber set 13 to the answer message and forwards it to the terminating call process (CP2).

When the terminating call process (CP2) receives the first answer message (i.e. answer 1), it forwards the answer message signal to the originating call process CP1 and the appropriate connections are made in either broadcast or conference mode.

More particularly, in the event that the call type is broadcast, a broadcast connection is implemented by the terminating call process (CP2) by connecting the receive channel of the off-hook subscriber set (i.e. subscriber set 13) to the calling subscriber set transmit channel (i.e. the PCM transmit channel for calling subscriber set 11). Call process CP2 generates a connect message signal in accordance with Appendix A, for connecting the transmit and receive channels of subscriber sets 11 and 13 respectively through digital switching circuit 3.

Alternately, in the event that the call type is conference, a 2-way connection is made by means of the terminating call process (CP2) connecting the transmit channel of subscriber set 13 to the receive channel of subscriber set 11 and the originating call process (CP1) connecting the transmit channel of subscriber set 11 to the receive channel of subscriber set 13 via digital switching circuit 3 by means of generating appropriate connect message signals.

When the second answer message (i.e. answer 2) is received by the terminating call process (CP2), in the event that the call type is broadcast, another broadcast connection is made from the calling subscriber set 11 to the second off-hook member subscriber set (e.g. subscriber set 28). In the event that the call type is conference, a create conference manager message signal is transmitted by terminating call process (CP2) for establishing a conference manager process (CM). The conference manager process (CM) transmits a set up conference message signal to a conference unit 33 of the communication system. The conference manager process (CM) then generates an add conferee message signal to the conference unit for allocating predetermined PCM channels. Upon successful allocation of conference channels, the conference manager process (CM) returns a conference manager waiting message signal to the originating call process CP1 and two conference manager waiting message signals to the terminating call process (CP2) (i.e. 1 per member).

Upon receipt of the conference manager waiting message signal by CP1, the process CP1 connects subscriber 11's transmit channel to the appropriate conference receive channel and sends an add conference member message to the CM.

Upon receipt of the 2 conference manager waiting message signals by CP2, the process connects 1. Subscriber 13's transmit to the appropriate conference receive channel and
2. Subscriber 28's transmit to the appropriate conference receive channel and sends 2 add conference member messages to the CM. The conference manager process receives the 3 message signals and connects the appropriate conference transmit channel with the caller/member receive channels for subscriber sets 11, 13, and 28.

The create conference manager, conference manager waiting, set up conference and add conferee message signals conform to the format illustrated in Appendix A.

When subsequent answer message signals are received by the terminating call process (CP2) (i.e. further answer message signals) in the event the call type is broadcast or a member cannot be added to the conference due to lack of resources, a broadcast connection is made as discussed above. In the event that the call type is conference, an update emergency conference/add member message signal is sent to the conference manager process (CM). When the conference manager receives this message, it sends an add conferee message signal to the conference unit 33 for allocating channels, connects the conference transmit channel and the new member receive channel, and sends a pos-ack message signal to the terminating call process (CP2). When the terminating call process (CP2) receives the pos-ack message signal, it connects the new member transmit channel to the conference receive channel.

When the associated peripheral controller 5A-5C detects that any one of the emergency hunt group member subscriber sets has gone on-hook, it sends a clear message signal to the controlling terminating call process (CP2). The terminating call process determines whether the member subscriber set is connected by broadcast or by conference. In the event that the connection is broadcast, the terminating call process (CP2) frees the designated channels. In the event that the connection is conference and there are additional members being broadcast to, the terminating call process (CP2) frees the allocated channels and sends an update emergency conference/delete and add member to the conference manager process (CM). The conference manager process sends a remove conferee message signal to the conference unit 33 in order to free the conference channels for the on-hook member, and then sends an add conferee message signal to the conference unit 33 in order to allocate the freed channels for the next member in broadcast mode. The conference manager (CM) makes the appropriate connections and sends a pos-ack message signal to the terminating call process (CP2) which also makes the appropriate connections.

In the event that the connection is conference and there are no further members being broadcast to, the terminating call process CP2 frees the allocated PCM channels and sends an update emergency conference/delete member message signal to the conference manager process transmits a remove conference message signal to the conference unit 33 in order to free the allocated conference channels. The clear and remove conferee message signals conform to the format illustrated in Appendix A.

When the peripheral controller 5B detects that the calling subscriber set 11 has gone on-hook, a clear message signal is sent to the originating call process (CP1). The originating call process frees the allocated PCM channels and sends a release message signal to the terminating call process (CP2) in the event that the call type is broadcast, or to the conference manager process (CM) in the event that the call type is conference.

In the event of a conference, when the release message signal is received by the conference manager process (CM), it then frees all of the conference resources and sends a release message signal to the terminating call process (CP2).

Upon receipt of the release message signal by the terminating call process (CP2), the terminating call process frees the allocated channels and sends multiple release message signals for all of the members that are remaining in the emergency call and sends a cancel request message signal to the emergency group manager process. The release and cancel request message signals also conform to the format shown in Appendix A.

Upon receipt of the cancel request message signal, the emergency group manager process (EM) frees the allocated PCM channels, sends appropriate release message signals for each member that has not yet answered, and returns a cancel ack message signal back to the terminating call process (CP2). The cancel-ack message signal conforms to the format of Appendix A.

When the terminating call process (CP2) receives the cancel ack message signal, it then frees the allocated PCM channels and sends appropriate release message signals for any members that may have answered in the meantime.

Thus, according to the present invention, an emergency calls system is provided within a central office or PABX exchange for providing emergency call features independently of any adjunct cross-connected emergency call circuitry. By providing the functionality within the communication system itself, substantial savings in cost and circuit complexity are obtained over prior art add-on systems.

The emergency call system of the present invention can function in either broadcast or conference mode. Also, because the emergency call functionality is software-based and internal to the communication system, special features such as call-forward and overide do-not-disturb may be invoked.

A person understanding the present invention may conceive of other embodiments or variations therein. All such modifications or variations are believed to be within the sphere and scope of the present invention as defined by the claims appended hereto.

APPENDIX A

```
Origination_tmpl =
      RECORD
         orig-swid : sw-id
      endrec pos_ack_tmpl =
      RECORD
         acknowledgement : byte;
         CASE command1 : byte OF
            nil_function_code:
               ();
            lockout:
               (eoml : byte);
            store_called_party_data:
               (rx_chan              : csc_id;

request_device_tmpl =
PACKED RECORD
      request_no          : request_number ;
      swid:               : swid ;
      tx_ch               : csc_id;
      rx_ch               : csc_id;
      q_regd              : device_queuing_type ;
      intercon_no         : interconnect_number_;
      ringing_type        : ring_cadence_id ;
      override            : override_type ;
      queuing_reason      : queuing_reason_;
      auto-answerable     : boolean;
      call_priority       : priority_range ;
      enable_flash        : boolean;
      CASE function_code1: byte OF
         Call_announcement_buffer:
               (buf_no : byte);
         outgoing_datacall_using_modem
               (modem_baud_rate : baud_rate_);
```

```
            ENDREC;
                device_seized_swid   : sw_id;
                dummy_field          : byte;  ( to store high order byte from sw1
                call_direction       : call_direction_;
                call_type            : call_type_;
                timer_to_set         : timer_setting_type;
                termination_type     : termination_type_ ;
                button_number        : ss4_line_range;
                line_swid            : sw_id;
                eom2    : byte);
          connect:
            (chan1         : csc_id;
             chan2         : csc_id;
             command2      : byte;
             baud_rate     : baud_rate_;
             parity        : parity_;
             eom3          : byte);
          campon_queued:
            (dataline_call : boolean;
             Q_Position    : byte ;
             NBE_termination : BOOLEAN ) ;
          request_camped_party_info:
            (buffer_num : buffer_number_range);
          cp_seize:
            (party_in_auto_answer_mode : boolean);
          retreive_campon:
            ( feat_act                 : feature_type ;
              guest_extension_to_ring  : sw_id ;
              announcement_buffer_used : buffer_number_range ) ;
     ENDREC;

seize_connect_ring_tmpl =
     RECORD
       function_code1 : byte; ( function_code1 = connect )
       tx_chan        : channel_number;
       tx_link        : link_number;
       rx_chan        : channel_number;
       rx_link        : link_number;
       function_code2 : byte; ( function_code2 = apply_ringing_ )
       ring_type      : ring_cadence_id;
       function_code3 : byte; ( nil or recall_enable)   (a.5294)
       end_of_message : byte; └─ nil_function_code)
     ENDREC;

connect_msg_tmpl =
     RECORD
       chan1          : csc_id; (source)
       chan2          : csc_id; (destination)
       end_of_message : byte; └─ nil_function_code)
     ENDREC;

termination_seize_tmpl =
     RECORD
       cr_ptr   : ptr_to_call_record;
       orig_is_in_callback_on_trunk   : boolean;
       terminators_swid          : sw_id;
     ENDREC;

answer_tmpl =
     RECORD
       cfna_or_sys_set : boolean;
       CASE function_code1 : byte OF u_r_a_103,
       nil_function_code:
           ();
```

```
        store_called_party_data:
           (rx_chan           : csc_id;
            device_swid       : sw_id;
            NBE_termination   : BOOLEAN ;
            dpnss_ccm_blkptr  : dpnss_msg_blk_ptr ;
            eom1              : byte );    └─ nil_function_code)

store_ss4_data:
           (dev_swid          : sw_id;
            line_swid         : sw_id;
            gam_swid          : sw_id;
            button_number     : ss4_line_range;
            eom2              : byte);

store_emergency_data:
           (emergency_member_swid     : sw_id;
            emergency_member_rx       : csc_id;
            emergency_member_tx       : csc_id;
            eom3                      : byte);

ENDREC;

create_conference_mgr_tmpl =
     RECORD
        conf_mem_1_pid     : process_id;
        conf_mem_1_group   : multigroup_range;
        conf_mem_1_swid    : sw_id;
        conf_mem_2_pid     : process_id;
        conf_mem_2_group   : multigroup_range;
        override_conference : conf_override_type;
        end_of_message     : byte;
     ENDREC;

conference_mgr_waiting_tmpl =
     RECORD
        conf_rx_chan       : csc_id;
        conf_swid          : sw_id;
        override_conference : conf_override_type;
     ENDREC;

add_conference_member_tmpl =
     RECORD
        conf_mem_pid       : process_id;
        conf_mem_group     : multigroup_range;
        conf_mem_swid      : sw_id;
        conf_mem_tx_chan   : csc_id;
        conf_mem_rx_chan   : csc_id;
        conf_mem_private   : boolean;
        conf_mem_privacy_release_status : privacy_release_status_;
        end_of_message     : byte;
     ENDREC;

update_emergency_conference_tmpl =
     RECORD
        updating_required  : emergency_update_types;
        add_member_swid    : sw_id;
        add_member_tx      : csc_id;
        add_member_rx      : csc_id;
        delete_member_swid : sw_id;
     ENDREC;

setup_conference_tmpl =
     RECORD
        conf_no            : 0..32;
        function_code1     : byte;  └─ add_conferee)
        conferee_0_conf_no : 0..32;
```

```
          conferee_O_tx_chan     : channel_number;
          conferee_O_tx_link     : link_number;
          conferee_O_port_type   : byte;
          end_of_message         : byte;
      ENDREC;

add_conferees_tmpl =
      RECORD
          conferee_1_conf_no     : 0..32;
          conferee_1_tx_chan     : channel_number;
          conferee_1_tx_link     : link_number;
          conferee_1_port_type   : byte;
          function_code1         : byte;   └ add_conferee or nil_function_code)
          conferee_2_conf_no     : 0..32;
          conferee_2_tx_chan     : channel_number;
          conferee_2_tx_link     : link_number;
          conferee_2_port_type   : byte;
          end_of_message         : byte;   └ nil_function_code)
      ENDREC;

remove_conferee_tmpl =
      RECORD
          conf_no                : 0..32;
          conf_chan              : channel_number;
          conf_link              : link_number;
          end_of_message         : byte;   └ nil_function_code)
      ENDREC;

old_origination_tmpl =
      RECORD
        CASE command1 : byte OF nil_function_code:
            ();

ani_test:
            (ani_result : cdo_tip_or_ring_party);

store_ss4_data:
            (lam_swid1      : sw_id;
             feat_act       : feature_type;
             button_num1    : ss4_line_range;
             eom1           : byte);     (nil_function_code)

keyhold_retrieve:
            (lam_swid2      : sw_id;
             holder_swid    : sw_id;
             button_num2    : ss4_line_range;
             eom2           : byte);     (nil_function_code)

add_mem_if_no_privacy:
            (lam_swid3      : sw_id;
             button_num3    : ss4_line_range;
             eom3           : byte);

dnic_data:
            (baud_rate      : baud_rate_;
             parity         : parity_;
             eom4           : byte);
      ENDREC;

origination_tmpl =
      RECORD
          orig_swid      : sw_id;
          command_data   : old_origination_tmpl;
      endrec;
```

```
clear_tmpl =
    RECORD
        function_code1 : byte;
    ENDREC;

release_tmpl =
    RECORD
        CASE function_code1 : byte OF
            suspect_cct,
            manbusy,
            release_onhook_fc,
            nil_function_code,
            per_test:
                ();
            set_device_status :
                (new_status : device_activity);
            apply_tone_signal_:
                (tone_to_apply  : byte;
                 eom2           : byte);    (nil_function_code)
            cp_dpnss_msg:
                (dpnss_crm_blkptr : dpnss_msg_blk_ptr);
    ENDREC;

answer_tmpl =
    RECORD
        cfna_or_sys_set : boolean;
        CASE function_code1 : byte OF u_r_a_103,
            nil_function_code:
                ();

store_called_party_data:
                (rx_chan          : csc_id;
                 device_swid      : sw_id;
                 NBE_termination  : BOOLEAN ;
                 dpnss_ccm_blkptr : dpnss_msg_blk_ptr ;
                 eom1             : byte );    nil_function_code)

store_ss4_data:
                (dev_swid      : sw_id;
                 line_swid     : sw_id;
                 gam_swid      : sw_id;
                 button_number : ss4_line_range;
                 eom2          : byte);

store_emergency_data:
                (emergency_member_swid : sw_id;
                 emergency_member_rx   : csc_id;
                 emergency_member_tx   : csc_id;
                 eom3                  : byte);

ENDREC;

create_conference_mgr_tmpl =
    RECORD
        conf_mem_1_pid     : process_id;
        conf_mem_1_group   : multigroup_range;
        conf_mem_1_swid    : sw_id;
        conf_mem_2_pid     : process_id;
        conf_mem_2_group   : multigroup_range;
        override_conference : conf_override_type;
        end_of_message     : byte;
    ENDREC;
```

```
conference_mgr_waiting_tmpl =
    RECORD
        conf_rx_chan         : csc_id;
        conf_swid            : sw_id;
        override_conference  : conf_override_type;
    ENDREC;

add_conference_member_tmpl =
    RECORD
        conf_mem_pid      : process_id;
        conf_mem_group    : multigroup_range;
        conf_mem_swid     : sw_id;
        conf_mem_tx_chan  : csc_id;
```

I claim:

1. In a communication system for receiving dialed digit signals from a plurality of subscriber sets connected thereto, a group emergency call system comprised of:

(a) means for storing one or more emergency hunt group assignment data tables each containing a predetermined pilot number for defining a predetermined emergency hunt group within said communication system, and a plurality of directory numbers corresponding to respective ones of said subscriber sets assigned to said predetermined emergency hunt group.

(b) means for receiving dialed digit signals designating an incoming emergency call from a predetermined one of said subscriber sets and comparing said dialed digit signals with said pilot number, and in the event said dialed digit signals correspond to said predetermined pilot number generating a request device message signal.

(c) means for receiving said request device message signal and in response retrieving said directory numbers from a corresponding one of said emergency hunt group assignment tables and in response generating a plurality of ringing signals for simultaneously ringing said respective ones of said subscriber sets assigned to said emergency hunt group, whereby embers of said emergency hunt group are alerted to said incoming emergency call, and (d) means for establishing communication paths in the form of bidirectional conference channels between said predetermined one of said subscriber sets and said respective ones of said subscriber sets.

2. An emergency call system as defined in claim 1, further comprised of means for detecting an off-hook condition of said respective ones of said subscriber sets and in response establishing respective communication paths between said respective subscriber sets and said predetermined one of said subscriber sets.

3. An emergency call system as defined in claim 2, further comprised of means for detecting an on-hook condition of said predetermined one of said subscriber sets and in response cancels said respective communication paths.

4. An emergency call system as defined in claim 2, 3, or 1, wherein said respective communication paths are in the form of a unidirectional broadcast channel from said predetermined one of said subscriber sets to said respective ones of said subscriber sets.

5. A method for initiating an emergency call within a communication system comprised of a plurality of subscriber sets comprising the steps of:

(a) storing one or more emergency hunt group assignment data tables each containing a predetermined pilot number for defining a predetermined emergency hunt group within said communication system, and a plurality of directory numbers corresponding to respective ones of said subscriber sets assigned to said predetermined emergency hunt group, (b) receiving dialed digit signals designating an incoming emergency call from a predetermined one of said subscriber sets and comparing said dialed digit signals with said pilot number, and in the event said dialed digit signals correspond to said predetermined pilot number generating a request device message signal, (c) receiving said request device message signal and in response retrieving said directory numbers from a corresponding one of said emergency hunt group assignment tables and generating a plurality of ringing signals for simultaneously ringing said respective ones of said subscriber sets assigned to said emergency hunt group, whereby members of said emergency hunt group are alerted to said incoming emergency call, and (d) establishing communication paths in the form of bidirectional conference channels between said predetermined one of said subscriber sets and said respective ones of said subscriber sets.

6. A method as defined in claim 5, further comprising the steps of detecting an off-hook condition of said respective ones of said subscriber sets and in response establishing respective communication paths between said respective subscriber sets and said predetermined one of said subscriber sets.

7. A method as defined in claim 6, further comprising the steps of detecting an on-hook condition of said predetermined one of said subscriber sets and in response clearing said respective communication paths.

* * * * *